United States Patent [19]

Retallick

[11] 4,162,993
[45] Jul. 31, 1979

[54] METAL CATALYST SUPPORT

[75] Inventor: William B. Retallick, West Chester, Pa.

[73] Assignee: Oxy-Catalyst, Inc., West Chester, Pa.

[21] Appl. No.: 894,180

[22] Filed: Apr. 6, 1978

[51] Int. Cl.² ............................................. B01J 35/02
[52] U.S. Cl. ............................ 252/477 R; 428/582; 428/592; 428/597; 428/603; 428/604
[58] Field of Search .................... 252/477 R; 428/582, 428/592, 597, 603, 604

[56] References Cited

U.S. PATENT DOCUMENTS

| | | | |
|---|---|---|---|
| 3,135,381 | 6/1964 | Holcombe | 428/592 |
| 3,376,120 | 4/1968 | Hiegel | 428/592 |
| 3,891,575 | 6/1976 | Brautigam et al. | 252/455 R |

*Primary Examiner*—W. J. Shine
*Attorney, Agent, or Firm*—Paul & Paul

[57] ABSTRACT

The catalyst support is a spiral formed by winding a single strip of metal upon itself. Indentations in the strip maintain a uniform spacing between the layers in the spiral. Heretofore this uniform spacing has been obtained only by winding a double layer of two strips, one flat and one corrugated.

5 Claims, 2 Drawing Figures

METAL CATALYST SUPPORT

BACKGROUND OF THE INVENTION

It is known to form a metal catalyst support by laying a corrugated strip upon a flat strip and then winding the double layer upon itself to form a spiral having axial channels for the flow of gas. This two strip construction has been described in U.S. Pat. Nos. 3,770,389, 3,891,575, in Society of Automotive Engineers Paper 770299, and in *Platinum Metals Review*, 21, No. 3, July, 1977. The two strip construction ensures that the spacing between successive layers in the spiral is uniform and that the axial channels are of uniform size. It would be advantageous to accomplish this uniformity in a spiral wound from a single strip, and that is one object of this invention.

BRIEF DESCRIPTION OF THE DRAWINGS

In FIG. 2, the second row of indentations is not included in the illustration, as to do so would render the illustration too confusing.

DETAILED DESCRIPTION OF THE PREFERRED EMBODIMENTS

Our object is to form a spiral by winding a single strip of metal upon itself, wherein the spacing between layers of the spiral is uniform. Our first attempt to ensuring uniform spacing is to indent the strip with indentations having uniform height equal to the desired spacing. But this alone will not ensure uniform spacing, because it is inevitable that somewhere along the spiral the indentations in successive layers will coincide and nest together so that the layers will collapse together. This coincidence can be prevented, and uniform spacing can be ensured, if the indentations are spaced along the strip in a pattern that varies, and is not repeated in any layer of the spiral. Now suppose that the indentations are formed by passing the strip between a pair of die wheels. If the circumference of the die wheels is at least as great as the circumference of the finished spiral, and if the pattern of spacing is not repeated around the circumference of the die wheels, our object is accomplished.

Figure 1:
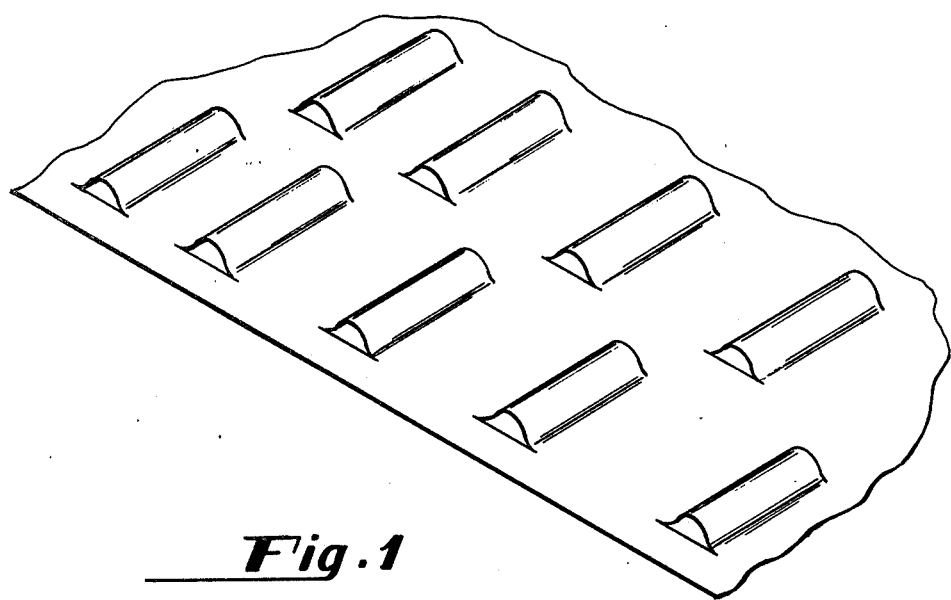
FIG. 1 is a perspective view of a fragmentary portion of a single strip showing first and second rows of indentations of uniform height, the spacing between the indentations varying according to a pattern which is not repeated in any layer of the spiral.
Figure 2:
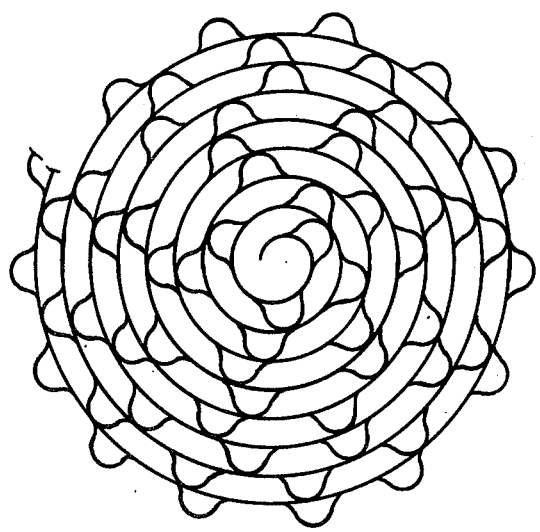
FIG. 2 is an end view of a spiral, or portion of a spiral, formed by winding the strip of FIG. 1 upon itself.

It is not possible to prevent isolated pairs of indentations in successive layers from falling into coincidence, even when the pattern of spacing is not repeated in any layer of the spiral. The coincidence of an isolated pair, by itself, will not allow the layers to collapse together. Collapse occurs only when a whole field of adjacent indentations fall into coincidence, so that it is only necessary to prevent the coincidence of a single pair from propagating into a field of coincidence. Consider a simple pattern of spacing designed to prevent propagation. Start with a single row of indentations along the length of the strip, spaced at intervals of 10, 11, 10, 11, 10, etc., which is equivalent to 10 plus 0, 1, 0, 1, 0 etc. Now add a second row of indentations spaced at intervals of 10,11,12,11,10,11 etc. which is equivalent to 10 plus 0,1,2,1,0,1, etc. The number of unit lengths covered by each repeating group of 2 in the first row is 21, and the number of unit spaces covered by each repeating group of 4 in the second row is 44. Therefore the alignment between the two rows can repeat only once in $21 \times 44 = 924$ unit lengths. If the unit length is chosen so that the outermost (longest) layer in the spiral is shorter than 924 unit lengths, there is no possibility that a field of coincidence will propagate across the rows, anywhere along the spiral. We can add a third row containing some other repeating group, or we can alternate repeating groups within a row. The combinations are many. In general, it will be cheaper to build up the non-repeating pattern of spacing in two or more rows instead of in a single row. So far, all we have said about the indentations is that they must be of uniform height, to ensure uniform spacing between the layers of the spiral. In addition, the indentations must be sufficiently rigid to withstand collapse when the spiral is wound, and they must not obstruct the flow of gas through the spiral. Indentations having the shape in FIG. 1 accomplish this. The raised surface of the indentation is cylindrical, which means that the surface is generated by a straight line that remains parallel to its original position as it generates the surface. The ends of the indentation are open. The indentations are aligned perpendicular to the length of the strip, and therefore parallel to the axis of the spiral. The indentations present only the edge of the indented metal to the gas flowing through the spiral, as shown in FIG. 2.

The invention resides in the use of a single strip of metal having spaced indentations defined in the strip. The indentations are so spaced relative to each other that when the strip is spiral wound about itself, the indentations of the successive layers of the spirally wound metal will not nest with each other. The resulting spaced sprially would strip results in an ideal metal catalyst support such as can be used in treatment of gaseous materials.

As is well known in the art, the metal catalyst support is treated so as to provide a coating of a catalyst on the support. The processes used to apply the catalyst are well known in the art.

What is claimed is:

1. A spiral formed by winding a strip of metal upon itself;
   (a) said strip having indentations of uniform height so that the spacing between layers of the spiral is equal to this height,
   (b) said indentations being spaced along the strip in a pattern that varies and is not repeated in any layer of the spiral, so that the indentations in successive layers cannot coincide and nest together.

2. A spiral formed by winding a strip of metal upon itself:
   (a) said strip having indentations of uniform height so that the spacing between layers of the spiral is equal to this height,
   (b) said indentations being spaced along the strip in a pattern that varies and is not repeated in any layer of the spiral, so that the indentations in successive layers cannot coincide and nest together,
   (c) said indentations having a cylindrical surface and open ends,
   (d) said indentations being aligned perpendicular to the length of the strip and parallel to the axis of the spiral, so that the indentations present only the edge of the indented metal to the gas flowing through the spiral.

3. A support for a catalyst formed by winding a strip of metal upon itself to form a spiral;
 (a) said strip having indentations of uniform height so that the spacing between layers of the spiral is equal to this height,
 (b) said indentations being spaced along the strip in a pattern that varies and is not repeated in any layer of the spiral, so that the indentations in successive layers cannot coincide and nest together,
 (c) said spiral being coated with a catalyst.

4. A support for a catalyst formed by winding a strip of metal upon itself to form a spiral;
 (a) said strip having indentations of uniform height so that the spacing between layers of the spiral is equal to this height,
 (b) said indentations being spaced along the strip in a pattern that varies and is not repeated in any layer of the spiral, so that the indentations in successive layers cannot coincide and nest together,
 (c) said indentations having a cylindrical surface and open ends,
 (d) said indentations being aligned perpendicular to the length of the strip and parallel to the axis of the spiral, so that the indentations present only the edge of the indented metal to the gas flowing through the spiral,
 (e) said spiral being coated with a catalyst.

5. A metal catalyst support, said support being comprised of a single strip of metal having defined therein along the length thereof a plurality of indentations of a given uniform height, said indentations being spaced from each other in a given pattern; said strip of metal being wound upon itself to provide a coil having a plurality of spirally wound layers with said indentations separating each successive layer by a distance equivalent to said given height and said pattern of indentations being of a pattern which does not nest with the indentations of the next successive layer.

* * * * *

UNITED STATES PATENT OFFICE
CERTIFICATE OF CORRECTION

Patent No. 4,162,993            Dated July 31, 1979

Inventor(s) William B. Retallick

It is certified that error appears in the above-identified patent and that said Letters Patent are hereby corrected as shown below:

Column 2, line 36, "would" should be --wound--.

Signed and Sealed this

Thirtieth Day of October 1979

[SEAL]

Attest:

RUTH C. MASON
Attesting Officer

LUTRELLE F. PARKER
Acting Commissioner of Patents and Trademarks